(12) United States Patent
Find et al.

(10) Patent No.: US 7,829,049 B2
(45) Date of Patent: Nov. 9, 2010

(54) METHOD FOR RECOVERY OF HIGH PURITY CARBON DIOXIDE FROM A GASEOUS SOURCE COMPRISING NITROGEN COMPOUNDS

(75) Inventors: Rasmus Find, Vejle (DK); Svend Geleff, Rodding (DK); Maj Toft Andersen, Lunderskov (DK)

(73) Assignee: Union Engineering A/S, Fredericia (DK)

( * ) Notice: Subject to any disclaimer, the term of this patent is extended or adjusted under 35 U.S.C. 154(b) by 63 days.

(21) Appl. No.: 11/996,110

(22) PCT Filed: Jul. 14, 2006

(86) PCT No.: PCT/DK2006/000417

§ 371 (c)(1), (2), (4) Date: Aug. 4, 2008

(87) PCT Pub. No.: WO2007/009461

PCT Pub. Date: Jan. 25, 2007

(65) Prior Publication Data

US 2008/0286189 A1    Nov. 20, 2008

(30) Foreign Application Priority Data

Jul. 18, 2005    (DK) ............................... 2005 01063

(51) Int. Cl.
*B01D 53/14*    (2006.01)
*B01D 53/54*    (2006.01)
*B01D 53/62*    (2006.01)
*B01D 53/46*    (2006.01)
*C01B 31/20*    (2006.01)

(52) U.S. Cl. .................. 423/228; 423/229; 423/400; 423/405

(58) Field of Classification Search .................. 423/228, 423/229, 235, 400, 405
See application file for complete search history.

(56) References Cited

U.S. PATENT DOCUMENTS

| 3,266,220 A | 8/1966 | Woertz |
| 5,832,712 A | 11/1998 | Ronning |
| 6,146,603 A * | 11/2000 | Chakravarti et al. ......... 423/228 |

FOREIGN PATENT DOCUMENTS

| EP | 0558175 A2 | 3/1994 |
| EP | 1059110 A | 12/2000 |
| WO | 2004073838 A | 9/2004 |
| WO | 2006037323 A | 4/2006 |

OTHER PUBLICATIONS

Engineering Feasibility of CO2 Capture on an Existing US Coal-Fired Fire Plant pp. 87-98, (2001).

* cited by examiner

*Primary Examiner*—Timothy C Vanoy
*Assistant Examiner*—Daniel Berns
(74) *Attorney, Agent, or Firm*—Browdy and Neimark, PLLC

(57) ABSTRACT

The present invention describes a method for recovery of high purity carbon dioxide, which is substantially free of nitrogen oxides. The present invention also discloses a plant for recovery of said high purity carbon dioxide comprising an absorption column, a flash column, a stripper column, and a purification unit.

11 Claims, 1 Drawing Sheet

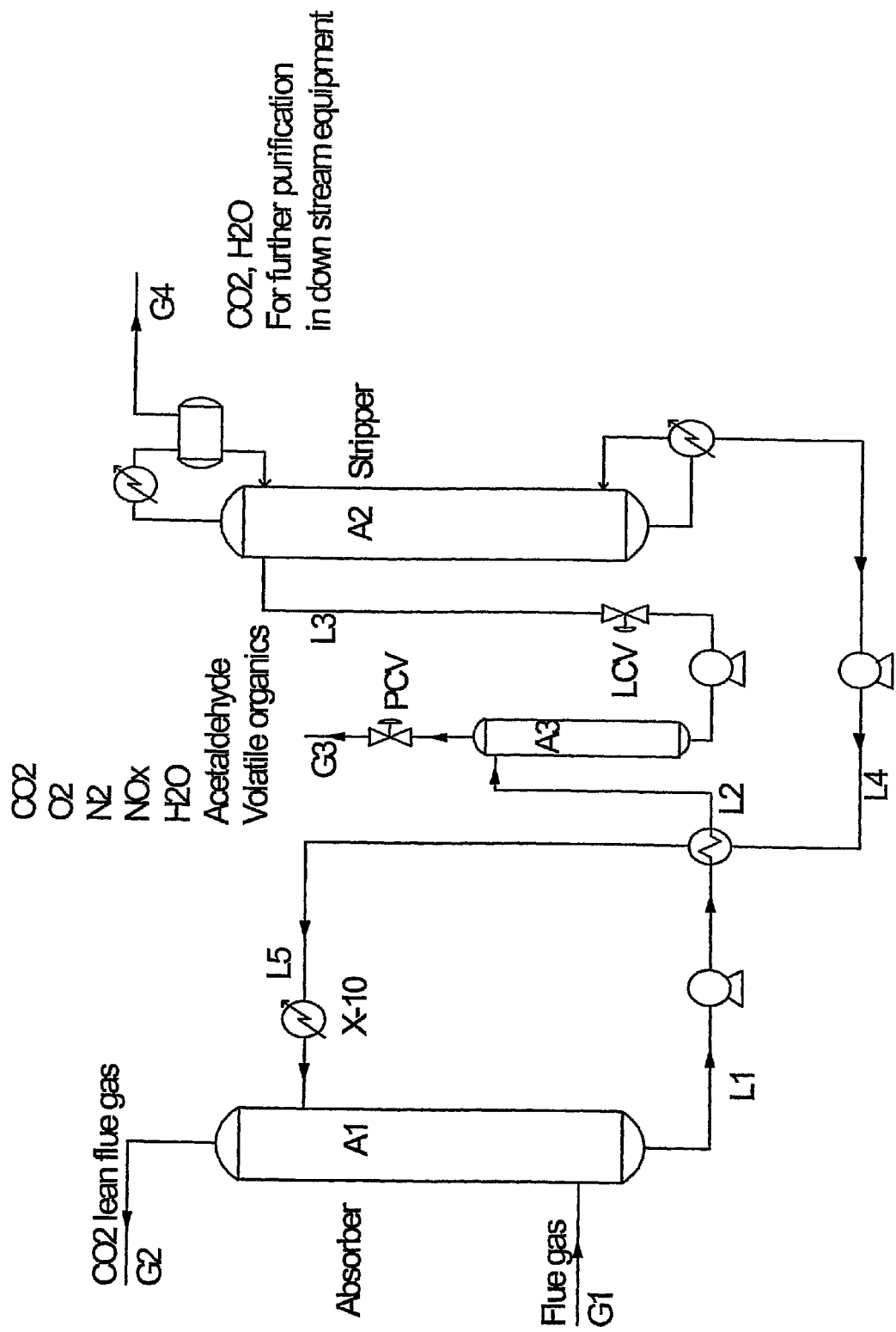

METHOD FOR RECOVERY OF HIGH PURITY CARBON DIOXIDE FROM A GASEOUS SOURCE COMPRISING NITROGEN COMPOUNDS

The present invention relates to a method for recovery of high purity carbon dioxide from a gaseous source and uses thereof. More particular, the present invention relates to the production of high purity carbon dioxide, which is substantially free of nitrogen oxides. The present invention also relates to a plant for the recovery of high purity carbon dioxide from a gas.

BACKGROUND OF THE INVENTION

Carbon dioxide is a well-known gas, which is present in the atmosphere. It is released to the atmosphere in large amounts by fermentation processes, limestone calcinations, and all forms of combustion processes of carbon and carbon compounds. In the recent decades, the attention in respect of said emission has been rising, because of the environmental problem due to future climate change via Greenhouse effect. Consequently, extensive work has been performed over the years in order to develop processes for the removal of carbon dioxide from combustion gases. If possible, a subsequent recovery of carbon dioxide may make those processes economical feasible.

One type of conventional methods for the recovery of carbon dioxide from a gaseous source is the absorption method, in which carbon dioxide is absorbed in an absorbing agent. If other gases, such as oxygen, are present in the gaseous source, said other gases may also be absorbed chemically and/or physically. This will be the case if alkanolamine is used as the absorbing agent.

It is well-known from the prior art that when $O_2$ is present in the carbon dioxide-containing gaseous source, said $O_2$ will be transferred into the alkanolamine-containing absorbing agent during the absorption procedure. As a consequence an unwanted degradation of alkanolamine as well as corrosion problems will occur due to the presence of $O_2$. Therefore, removal of $O_2$ from the absorbing agent will improve the efficiency of the absorption procedure.

Many prior art documents relate to this problem. EP 1 059 110 discloses a system for recovering absorbate such as carbon dioxide using an alkanolamine absorbent fluid, wherein the loaded absorbent is heated in a two step heating procedure prior to the separation of the absorbate from the absorbent, and wherein the loaded absorbent is deoxygenated after the first heating step and prior to the second heating step. The deoxygenation takes place by means of depressurisation.

In EP 1 061 045 a system for recovering absorbate such as carbon dioxide from an oxygen-containing mixture is described, wherein carbon dioxide is concentrated in an alkanolamine-containing absorption fluid, oxygen is separated from the absorption fluid, and carbon dioxide is steam stripped from the absorption fluid and recovered. In this system, the oxygen is separated from the absorption fluid by passing the carbon dioxide loaded absorbent comprising dissolved oxygen in countercurrent mass transfer contact with oxygen scavenging gas.

In other cases nitrogen oxides (also named NOx) may be present in addition to $O_2$ in the gaseous source. These NOx gases will also be absorbed chemically and physically in the absorbing agent, when alkanolamine is used as the absorbing agent. When separating the carbon dioxide from the absorbing agent in a subsequent stripper process, part of the absorbed NOx will be released in the stripper off gas together with degradation products, especially acetaldehyde. The stripper off gas will further contain $N_2$ and $O_2$ in some amounts.

When producing food grade carbon dioxide or other carbon dioxide applications, where a high purity is required, these components must be removed from the stripper off gas in down stream equipment in order to obtain the required purity. Conventional technology available for removing NOx involves scrubbing, oxidation, adsorption and distillation.

Due to the chemical equilibrium: $NO+\frac{1}{2}O_2 <-> NO_2$, the NOx composition (NO, $NO_2$) will change during the purification procedure whenever changes in temperature, pressure and/or concentrations occur, and this makes it difficult to reduce the NOx content in the end product.

Hence, an object of the present invention is to provide a method for the recovery of high purity carbon dioxide, which is substantially free of nitrogen oxides.

The present inventor has surprisingly found that by introducing a flash column between the absorption column and the stripper the content of NOx in the stripper off gas can be markedly reduced.

This is due to the fact that when the equilibrium condition of the liquid leaving the absorption column is carefully changed just before feeding said liquid into the flash column a condition where said liquid is unsaturated in respect of $O_2$ and NOx will occur, and consequently said gases will be transferred from the liquid phase into the gas phase during the flashing procedure. In this way substantially all $O_2$ and the main part of NOx are removed from the liquid phase in the flash column and will therefore never reach the stripper.

In a next step, the liquid leaving the flash column is fed into the stripper column, in which the gases are separated from the absorbing agent. As a consequence of the very low amount of $O_2$ reaching the stripper column, the concentration of $O_2$ in the stripper off gas will be very low. Hence, in the stripper off gas the chemical equilibrium: $NO+\frac{1}{2}O_2 <-> NO_2$, is shifted far to the left, and the traces of NOx present will mainly be in the form of NO. Therefore, the further purification procedure, which is required in order to remove said traces of NOx whenever high purity carbon dioxide is produced, is much easier and cost effective, because of the control of the above-mentioned chemical equilibrium.

DESCRIPTION OF THE INVENTION

In one aspect the present invention relates to a method for recovery of high purity carbon dioxide from a gaseous source, where said high purity carbon dioxide is substantially free of nitrogen oxides.

The method according to the present invention comprises the steps of:

a. feeding a gas comprising carbon dioxide, oxygen, and nitrogen compounds into an absorption column, b. absorbing the feeding gas in an alkanolamine-containing absorbing agent, by which the feeding gas is separated into a carbon dioxide-depleted gas and a carbon dioxide-rich liquid, c. pressurising and heating the liquid obtained in step b in order to provide a pressurised and heated liquid, d. separating by means of flashing the liquid obtained in step c into a NOx- and oxygen-rich gas and a NOx- and oxygen-depleted liquid leaving the flash column, e. pressurising the liquid leaving the flash column in step d in order to provide a pressurised liquid, f. separating the liquid obtained in step e into a carbon dioxide-rich gas and a carbon dioxide-depleted liquid by means of stripping, and g. purifying the gas obtained in step f in order to produce high purity carbon dioxide, which is substantially free of nitrogen oxides.

In principle, any kind of gas comprising carbon dioxide, oxygen, and nitrogen compounds may be applied in the process. In a preferred embodiment, however, the feeding gas is flue gas.

In the absorption step (step b) any absorbing agent comprising alkanolamine may be applied. Preferably, the alkanolamine in the absorbing agent is selected from the group consisting of monoethanolamine, diethanolamine, diisopropanolamine, methyldiethanolamine and triethanolamine. Most often the absorbing agent is an aqueous solution of one of the above-mentioned alkanolamine. However, mixtures comprising two or more of the listed alkanolamines in any mixing ratio may also be used in the method according to the present invention. It is within the skills of a practitioner to determine the optimal amount and composition of the absorbing agent in order to achieve a suitable absorption procedure.

The liquid leaving the absorption column is then pressurised and heated. It is within the knowledge of a skilled person to perform such processes.

As explained above, the introduction of the flashing step (step d) in the method of the present invention makes it possible to produce a stripper off gas, which is substantially free of oxygen, and only contains traces of nitrogen oxides. However, in order to achieve this beneficial effect the flash column must operate at a higher temperature and a pressure, which is higher than or close to the equilibrium conditions of the liquid stream leaving the absorption column. Under such conditions, the liquid entering the flash column will be unsaturated and the release of non-saturated components is possible. Hence, due to the new equilibrium conditions substantially all $O_2$ and the main part of NOx will be removed from the flash column in the gas stream, and therefore never reach the stripper column.

In a preferred embodiment the temperature of the liquid obtained in step c is in the range of 70° C. to 140° C., more preferred in the range of 90° C. to 120° C., and most preferred in the range of 95° C. to 110° C., and the pressure of said liquid is in the range of 0.1 bar to 3 bar, more preferred in the range of 0.2 to 2 bar, and most preferred in the range of 1 bar to 2 bar. A person skilled in the art will know how to perform such pressurising and heating procedures.

The gas obtained in step d, which comprises a significant amount of carbon dioxide in addition to oxygen, nitrogen compounds, acetaldehyde, and optionally other volatile organics, may be recycled to the absorption column in order for a second recovery procedure of the carbon dioxide. Alternatively, the said gas may be disposed of.

The liquid leaving the flash column is pressurised before entering the stripper column. A person skilled in the art will know how to perform such a pressurisation.

In the stripper column the pressurised liquid from the flashing column is separated into a carbon dioxide-rich gas and a carbon dioxide-depleted liquid. As mentioned above, due to the removal of oxygen and nitrogen oxides in the flash column, the $O_2$ and NOx content will be reduced dramatically in the stripper off gas stream. Because of the reduced amount of NOx and the very limited amount of $O_2$ in the stripper off gas, the equilibrium reaction: $NO + \frac{1}{2}O_2 <-> NO_2$, will shift to the left to form mainly NO.

The liquid obtained in step f, which mainly comprises the absorbing agent, optionally an aqueous solution of the absorbing agent, may be recycled and mixed with the alkanolamine-containing absorbing agent used for absorbing the gas in step b. However, before entering the absorption column, an adjustment of the temperature and/or the pressure of said liquid may be required.

In the method according to the present invention, the purifying procedure of the gas in step g may be performed by use of any procedure known within the art such as inert separation in a down stream stand alone condenser or in conjunction with a distillation column. Residual NOx may also be removed using adsorption technique in the liquid phase. It is within the knowledge of a skilled person to determine and combine the purification and liquefaction of the gas in order to obtain the combination most feasible.

Further advantages obtained by the introduction of the flash column include preventing the release of degradation products such as acetaldehyde in the stripper off gas, which will reduce purity requirements for down stream equipment. In addition the amount of purge gas from condensation may be reduced as the inert content will be reduced, especially $O_2$ and $N_2$. This will increase the possible overall recovery of carbon dioxide as the amount of carbon dioxide used for purging may be reduced.

Another aspect of the present invention relates to the use of the method according to the invention for the production of high purity carbon dioxide. The purity of the carbon dioxide product is preferably of food grade quality, and thus usable as a component in any kind of foodstuff. In a particular preferred embodiment the carbon dioxide produced according to the method of the invention is used as a component in soft drinks.

In yet another aspect a plant for recovery of high purity carbon dioxide is provided. Such a plant comprises an absorption column having a gas outlet and a liquid outlet, said liquid outlet being connected to a flash column having a gas outlet and a liquid outlet, said liquid outlet being connected to a stripper column having a gas outlet and a liquid outlet, and where said gas outlet is connected to a unit for further purification of the gas leaving the stripper column.

The absorption column to be used may be any column known in the art suitable for the performance of absorbing gaseous carbon dioxide into an alkanolamine-containing absorbing agent. Examples of suitable absorption columns to be used are columns, which contain internals or mass transfer elements such as trays or random or structured packing.

The flash column may be any kind of flash distillation columns known in the art. Examples of suitable flash columns are columns, which contain internals or mass transfer elements such as trays or random or structured packing. A skilled person may easily determine whether one or more high pressure flash distillation column(s) or one or more low pressure distillation column(s) or a combination thereof is required in order to obtain a favourable result. It will also be within the knowledge of the skilled person to determine whether a desired result is best achieved by using only one column, or by using two or more columns connected in series or in parallel.

The stripper column to be used in the plant may be any packed column known in the art. Examples of suitable stripper columns are columns, which contain internals or mass transfer elements such as trays or random or structured packing.

The unit for further purification of the gas leaving the stripper may be of any type and combination known in the art.

In a preferred embodiment the gas outlet of the flash column is connected to the absorption column. By this configuration the gas leaving the flash column may be recycled to the absorption column. This recirculation has the beneficial effect of providing a second recovery step of the carbon dioxide, which was transferred from the liquid phase to the gas phase during the flashing step and, hence, otherwise would have been lost.

In another preferred embodiment the liquid outlet of the stripper column is connected to the absorption column, which make it possible to recycle the liquid, which leaves the stripper column. The beneficial effect of this recirculation is the reuse of absorbing agent, which otherwise would have to be disposed of.

It is within the standard procedure of a skilled person to calculate the numbers and sizes of each of the above-mentioned units of the plant when the mass flow, the chemical composition, the temperature, and the pressure of each stream is known in order to obtain the most feasible mode of operating the plant.

When selecting suitable materials for each of said units, special consideration must be directed to the temperature, the pressure, and the chemical and physical properties of the gases and liquids to be treated. However, such consideration will be within the knowledge of a person skilled in the art.

Furthermore, a skilled person can easily acknowledge that the selection and control of process parameters will depend on the chemical composition of the gas entering the plant as well as the chemical composition and physical condition of the gases and liquids in each step of the method. Calculations for determining the number and size of heat exchangers in order to minimize the energy consumption for heating and cooling are standard procedure for a person skilled in the art. Also the selection of units for increasing and decreasing the pressure of the gas and liquid streams lies within the working area of a skilled person.

In the following the invention is described in more detail with reference to the at present most preferred embodiment and to the FIGURE. Said FIGURE depicts a schematic flow diagram for the $CO_2$ recovery according to the present invention.

Data with respect to pressure and temperature as well as the composition of the interesting chemical components are given in the table below. All references to pressures are to the total pressure. All percentages and ppm specifications are based on mole fractions.

The gas G1 fed to the plant is a flue gas comprising 11.6% $CO_2$, 3.4% $O_2$, 10 ppm $NO_2$, and 100 ppm NO. This gas enters the absorption column A1 at a temperature of 42° C. and a pressure of 1.02 bar. The other main components of the feeding gas are 77.3% $N_2$, and 7.7% $H_2O$.

In the absorption column A1, the feeding gas G1 is mixed with the liquid L5, which is recycled from the stripper column A2 through the heat exchanger X-10. As the absorbing agent an aqueous solution of monoethanolamine is used. The gas stream G2 leaving the absorption column A1 has a temperature of 47 C and a pressure of 1.02 bar, and comprises 0.9% $CO_2$, 3.8% $O_2$, 0.1 ppm $NO_2$, and 119 ppm NO. Another major component is $N_2$, which is present in the gas G2 at 85%.

The liquid stream L1 leaving the absorption column A1 comprises the aqueous solution of monoethanolamine. The contents of $O_2$, $NO_2$, and NO are 0.4 ppm, 0.7 ppm and 0.1 ppm, respectively. When leaving the absorption column A1, the liquid stream L1 has a temperature of 50° C. and a pressure of 1.02 bar. However, before entering the flash column A3 as the liquid L2 the temperature is increased to 95° C. and the pressure is increased to 2 bar.

In the flash column A3 the liquid L2 is separated into a gas stream G3 and a liquid stream, which both are leaving the flash column A3 through the pressure control valve PCV at a temperature of 91 C and a pressure of 1.1 bar. The gas G3 leaving the flash column A3 comprises 34.8% $CO_2$, 0.42% $O_2$, 107 ppm NO, and 1 ppm $NO_2$. Other components, such as $H_2O$, acetaldehyde and volatile organics are also present in the gas G3. In the specific embodiment shown in the FIGURE, the gas stream G3 is not recycled to the absorption column A1. The main component of the liquid leaving the flash column A3 is the aqueous solution of monoethanolamine.

The pressure of the liquid stream L3 leaving the flash column A3 and passing through the level control valve LCV is then increased to 3 bar just before entering the stripper column A2.

In the stripper A2 the liquid L3 is separated into a gas stream G4 and a liquid stream. The liquid stream L4 has a temperature of 112° C. and a pressure of 2 bar, and the contents of $CO_2$, $O_2$, $NO_2$, and NO are not detectable. In the

TABLE

Pressure, temperature and chemical composition of selected gas and liquid streams.

| | Pressure (bar) | Temp. (° C.) | $CO_2$ mole | $O_2$ mole | $NO_2$ mole | NO mole |
|---|---|---|---|---|---|---|
| Gas G1 entering the absorption column | 1.02 | 42 | 11.6% | 3.4% | 10 ppm | 100 ppm |
| Gas G2 leaving the absorption column | 1.02 | 47 | 0.9% | 3.8% | 0.1 ppm | 119 ppm |
| Liquid L1 leaving the absorption column | 1.02 | 50 | — | 0.4 ppm | 0.7 ppm | 0.1 ppm |
| Liquid L2 entering the flash column | 2 | 95 | — | 0.4 ppm | 0.7 ppm | 0.1 ppm |
| Gas G3 leaving the flash column | 1.1 | 91 | 34.8% | 0.42% | 1 ppm | 107 ppm |
| Liquid L3 entering the stripper | 3 | 91 | — | 0.01 ppm | n.d. | n.d. |
| Gas G4 leaving the stripper | 1.2 | 45 | 92.9% | 3 ppm | n.d. | n.d. |
| Liquid L4 after the stripper | 2 | 112 | — | n.d. | n.d. | n.d. |
| Liquid L5 before the absorption column | 2 | 63 | — | n.d. | n.d. | n.d. |
| Product gas after purification | 16 | −26 | ~100% | n.d. | n.d. | n.d. | n.d.: not detectable embodiment shown in the FIGURE, the liquid stream L4 is recycled to the absorption column A1 as the liquid stream L5. However, before entering the absorption column A1 the temperature of the liquid stream L5 is decreased to 40° C.

The gas stream G4 leaves the stripper at a temperature of 45° C. and a pressure of 1.2 bar, and comprises 92.9% $CO_2$ and 3 ppm $O_2$.

The gas stream leaving the stripper column A2 is then entering the purification and liquefaction unit. The product stream of high purity carbon dioxide, which is substantially free of nitrogen oxides, is leaving the plant at a temperature of −26° C. and a pressure of 16 bar.

The invention claimed is:

1. A method for recovery of high purity carbon dioxide from a gaseous source comprising:
   a. feeding a gas (G1) comprising carbon dioxide, oxygen, and nitrogen compounds into an absorption column (A1),
   b. absorbing the gas (G1) in an alkanolamine-containing absorbing agent, by which the gas (G1) is separated into a carbon dioxide-depleted gas (G2) and a carbon dioxide-rich liquid (L1),
   c. pressurising and heating the carbon dioxide-rich liquid (L1) obtained in step b in order to provide the liquid (L2),
   d. separating by flashing the liquid (L2) obtained in step c into a NOx- and oxygen-rich gas (G3) and a NOx- and oxygen-depleted liquid leaving the flash column (A3),
   e. pressurising the liquid leaving the flash column (A3) in step d in order to provide the liquid (L3),
   f. separating the liquid (L3) obtained in step e into a carbon dioxide-rich gas (G4) and a carbon dioxide-depleted liquid (L4), by stripping, and
   g. purifying the carbon dioxide-rich gas (G4) obtained in step f in order to produce high purity carbon dioxide, which is substantially free of nitrogen oxides.

2. A method according to claim 1, wherein the temperature of the liquid (L2) obtained in step c is in the range of 70° C. to 140° C. and the pressure of said liquid (L2) is in the range of 0.1 bar to 3 bar.

3. A method according to the claim 1, wherein the feeding gas (G1) is flue gas.

4. A method according to the claim 1, wherein the temperature of the liquid (L2) obtained in step c is in the range of 70° C. to 140° C., and the pressure of said liquid (L2) is in the range of 0.1 bar to 3 bar and the feeding gas (G1) is flue gas.

5. A method according to claim 1, wherein the alkanolamine in the absorbing agent is selected from the group consisting of monoethanolamine, diethanolamine, diisopropanolamine, methyldiethanolamine and triethanolamine, and mixtures thereof.

6. A method according to claim 1, wherein the temperature of the liquid (L2) obtained in step c is in the range of 70° C. to 140° C., and the pressure of said liquid (L2) is in the range of 0.1 bar to 3 bar and the alkanolamine in the absorbing agent is selected from the group consisting of monoethanolamine, diethanolamine, diisopropanolamine, methyldiethanolamine and triethanolamine, and mixtures thereof.

7. A method according to claim 1, wherein the feeding gas (G1) is flue gas and the alkanolamine in the absorbing agent is selected from the group consisting of monoethanolamine, diethanolamine, diisopropanolamine, methyldiethanolamine and triethanolamine, and mixtures thereof.

8. A method according to claim 1, wherein the carbon dioxide-depleted liquid (L4) obtained in step f is recycled and mixed with the alkanolamine-containing absorbing agent used for absorbing the feeding gas (G1) in step b.

9. A method according to claim 1, wherein the NOx- and oxygen-rich gas (G3) obtained in step d is recycled to the absorption step b.

10. A method according to claim 1, wherein the carbon dioxide-depleted liquid (L4) obtained in step f is recycled and mixed with the alkanolamine-containing absorbing agent used for absorbing the feeding gas (G1) in step b and the NOx- and oxygen-rich gas (G3) obtained in step d is recycled to the absorption step b.

11. A method according to claim 1 for the production of high purity carbon dioxide.

* * * * *